March 3, 1959

F. A. PURDY 2,876,002

CONTROL SYSTEMS

Filed Aug. 2, 1955

INVENTOR
FREDERICK A. PURDY
BY
ATTORNEY

March 3, 1959　　F. A. PURDY　　2,876,002
CONTROL SYSTEMS
Filed Aug. 2, 1955　　9 Sheets-Sheet 6
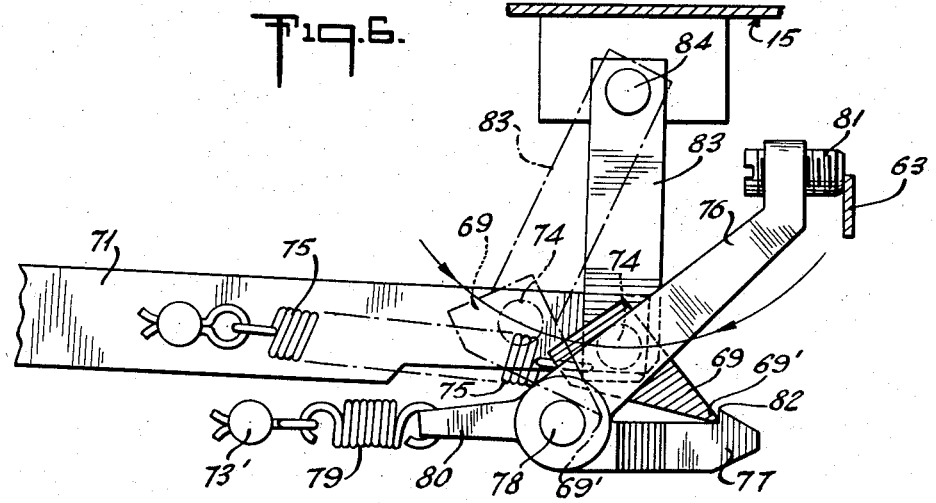
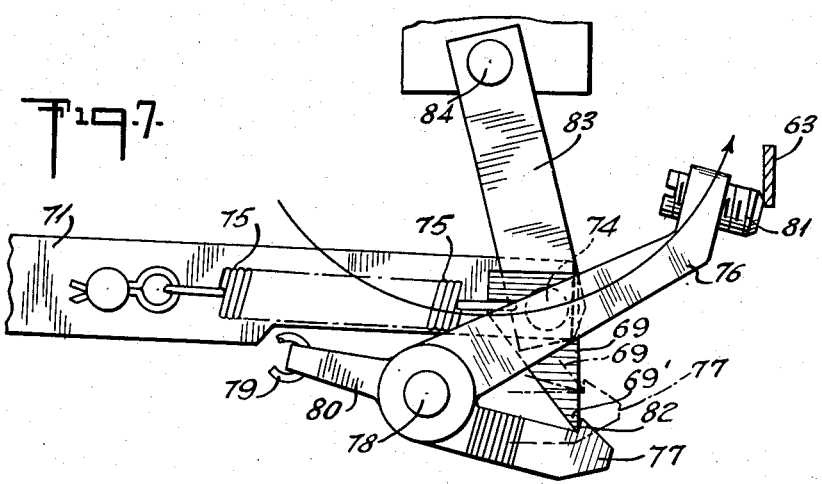
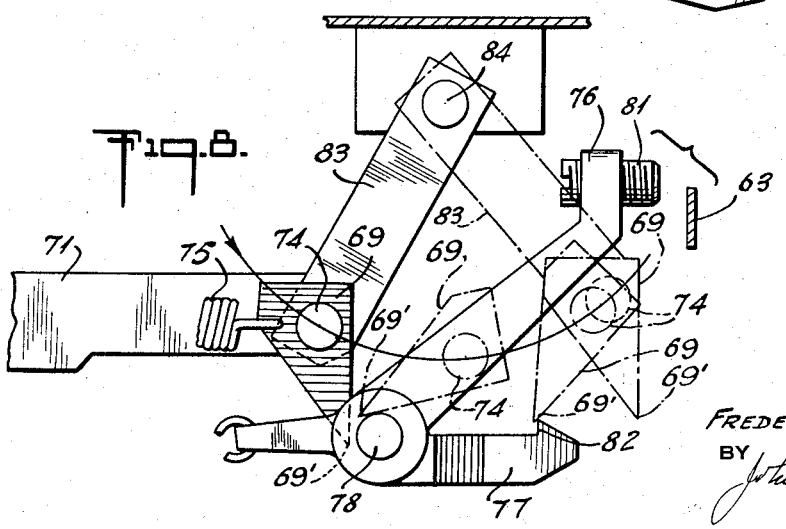
INVENTOR
FREDERICK A. PURDY
BY
ATTORNEY

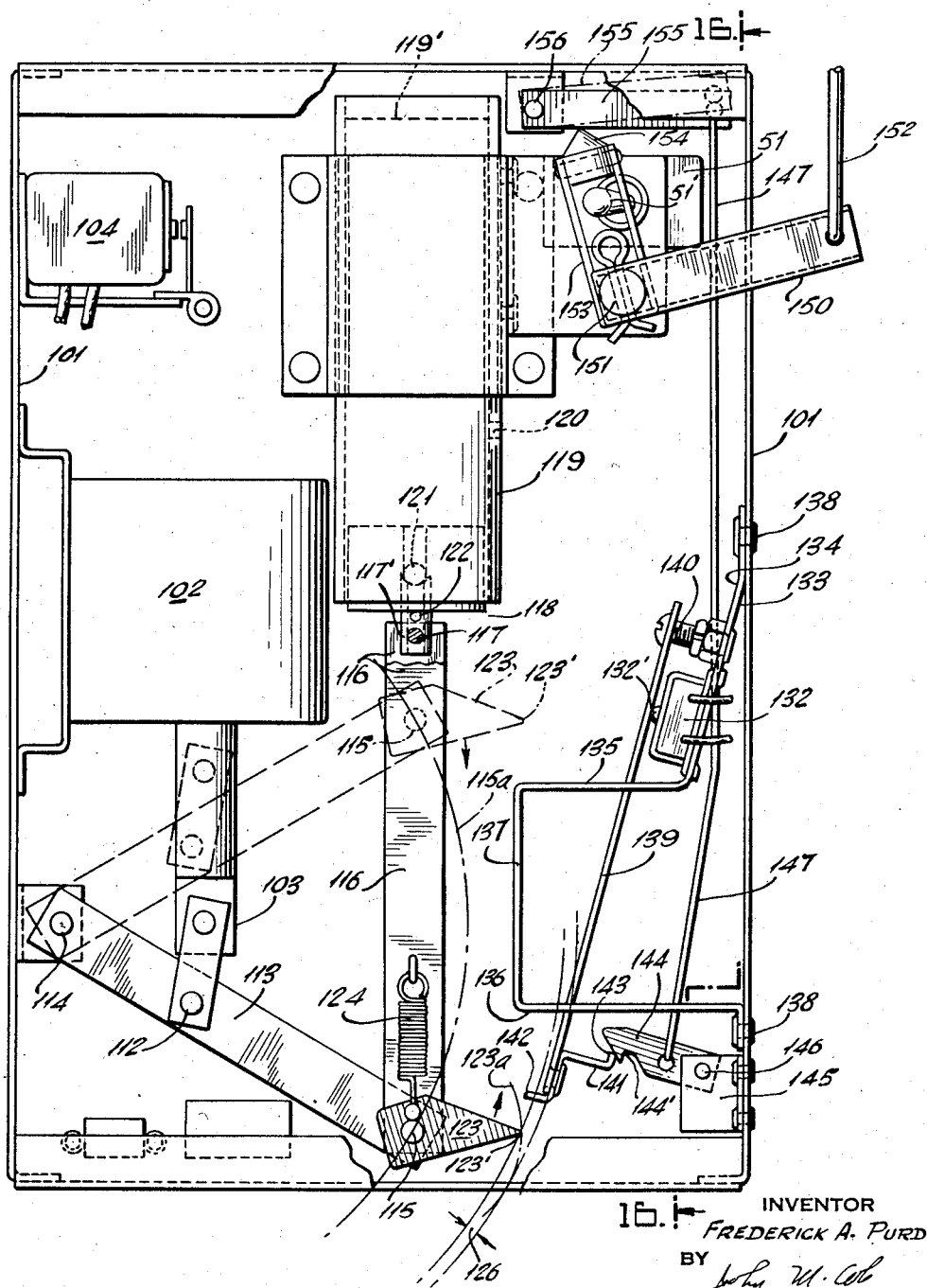

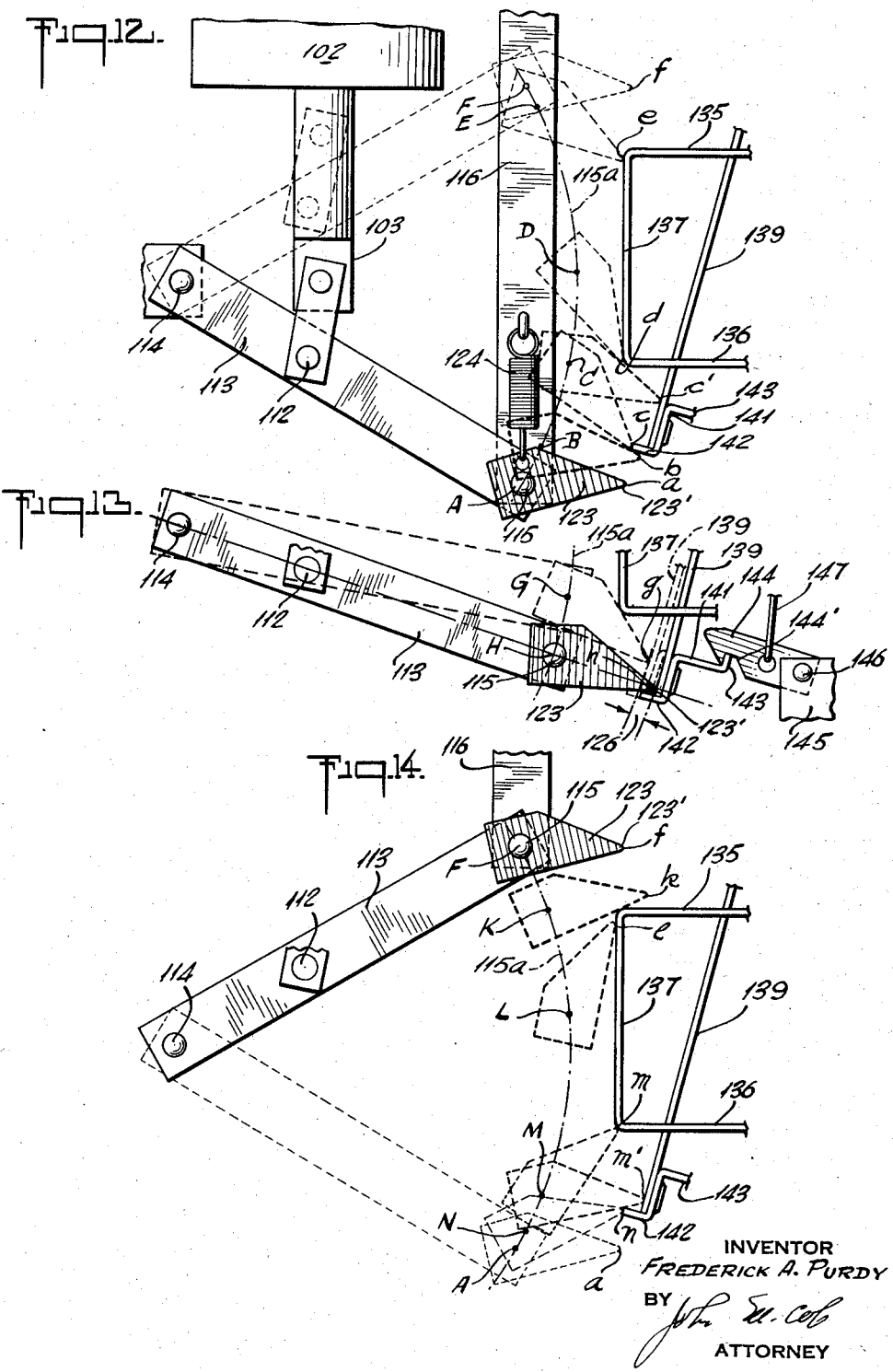

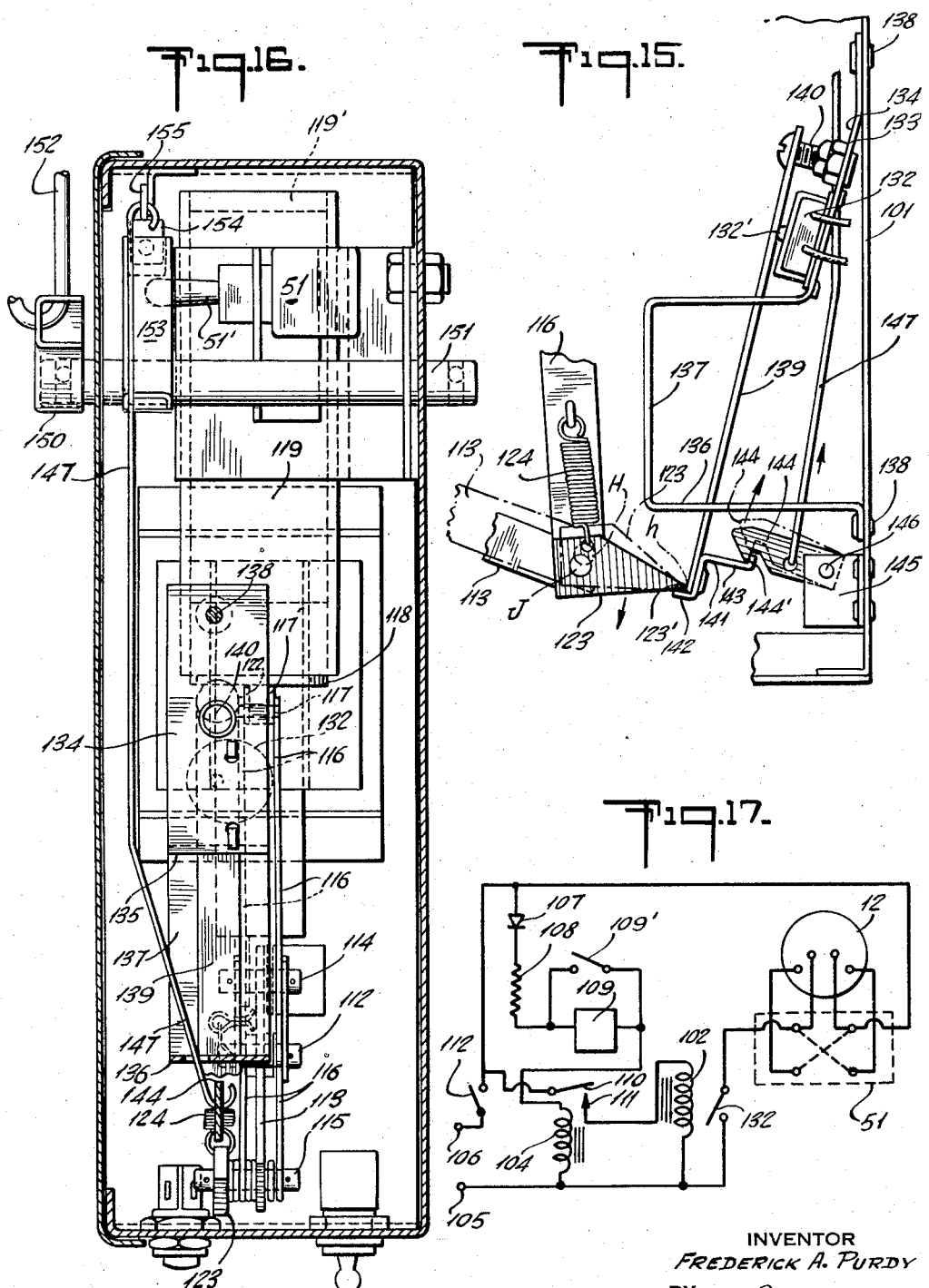

United States Patent Office 2,876,002
Patented Mar. 3, 1959

2,876,002

CONTROL SYSTEMS

Frederick A. Purdy, Scarsdale, N. Y.

Application August 2, 1955, Serial No. 526,035

34 Claims. (Cl. 268—59)

The present invention relates to control systems and more specifically to controls useful among other things for opening and closing doors in response to light or other suitable actuating signals.

While the invention may be employed in a wide variety of applications, for present purposes it will be described as a light sensitive control for garage doors and the like.

The use of a light-beam from an automobile headlamp, for actuating a garage door to open or close, has encountered difficulties with ambient daylight, and has met with an acute problem in erratic operation by lightning, by sunlight directly, and by sunlight indirectly through snow-reflection. Solutions have been sought in ways of applying light that rarely may be reproduced by nature, such as a series of lightflashes. An object of the invention here presented is to involve the user in the very simplest procedure.

With ambient daylight, the difficulty has been to provide, at a light sensitive device, an excess, over daylight, of light from a headlamp beam, such that the flow of electric current obtained by the beam is in a quantity that can be used in a simple and inexpensive apparatus. The difficulty is met in some measure in the pending patent application of John Hofer (assigned to herein applicant), filed December 7, 1954, Serial No. 473,572.

With sunlight and lightning, the problem has been to find a means of nullification. Without such means, erratic door-operation may be produced by lightning, or by direct sunlight at sunrise or at sunset in some garage exposures, or by snow reflections of sunlight in an intensity approximately that of a conveniently removed headlamp beam. The simple solution in the invention here described is to actuate the door upon the extinguishment or withdrawal of applied light, which may be at will, and within a set time-period after the light has been applied. Accordingly, it is fundamental to the invention here disclosed that actuation follows not with the application of light but with timely extinguishment or withdrawal of the light.

It is a collateral object of this invention, as against devices which respond to the subsidence and the onset of natural light, to nullify the effects of natural light, and to work with artificial light.

An object is the combination of light controlled apparatus with a light sensitive device effective under atmospheric temperatures, pressures, and influences, and capable of instantaneous response to applied light, requiring no time-period before response, such as would be necessary for the heating of amplifiers. Its values over photo-electric cells, that have elements which must be protected from the atmosphere by gas-filled envelopes or by vacuum tubes, are in low cost, simplicity, durability, rapidity, and compactness of installation in exposing to a headlamp beam.

A further object is to use a cell or a crystal, as about to be described, which has the further value that it can close a sensitive relay without amplification of the current that flows from or through it. The photo-electric cell of the gas-filled or vacuum type discharges current on the order of two microamperes, not enough, without amplification, to energize and close a low cost sensitive relay, as ordinary relays are known in the art, as against approximately two milliamperes of current from the cell or crystal, a thousand times as much.

As above mentioned, an object of the invention is to obtain actuation of a door with the simplest procedure and least attention or resort to skill by the user. Door operating devices using a code of impulses either to differentiate from lightning, sunlight, and sporadic light of other kinds, or to avoid the risk of others than the owner opening a garage door, are not popular with owners. Owners want to get their doors opened or closed from the car with a minimum of ceremony. They want simplicity, and resist the learning of routines. Difficulties with such routines are magnified by car-lightning controls which have dim and bright stages. The invention here described operates with one single on and off movement. Owners are little concerned with safety except at night and during absences of some duration. Few garages ever are locked. Practically all are unlocked when the car is away for routine periods.

The light sensitive device may be a cell or tablet composed of any suitable material or materials which, when lighted, produces electric current or increases the flow of current, and, when dark stops or reduces the current. It may be a current-producing cell known in the art as a voltaic or self-generating cell, consisting of a metal disc to which a light sensitive material is bonded, which converts light energy into electrical energy; or it may be a junction-type composite semiconductor, of semiconductive material such as germanium or silicon, in which two bodies of the same conductivity type are contigious to and in junction with a body between them of the opposite conductivity type, as shown in Patent No. 2,641,713 to J. N. Shive, issued June 9, 1953; or it may be an electricity-valving crystal of cadmium sulphide, or of zinc sulphide, or of material with similar characteristics, the kind of crystal which resists electric current when it is dark, and conducts current when lighted.

The electricity-valving crystal is the preferred device. It will be the more generally mentioned in the first described embodiment of the invention, by the term "crystal" or the term "electricity-valving crystal."

The term "self-generating cell" will be understood as indicating a current-producing cell. This cell is generally mentioned in the secondly described embodiment.

The term "junction-type semiconductor" will be understood as indicating the device made up of bodies of opposite conductivity types.

The term "photo-electric cell" with be understood as indicating a light sensitive device protected from the atmosphere, as by a gas-filled envelope or a vacuum tube.

The terms "light sensitive device," or "light sensitive element," or "light sensitive cell," or "light sensitive means," will be understood as indicating any one of the four: the electricity-valving crystal, the self-generating cell, the junction-type semi-conductor, or the photo-electric cell, or any suitable substitute.

The term "electrically responsive to light" will mean resulting in the flow of electric current when light is applied and restricting flow when light is withdrawn.

The accompanying drawings show, for purposes of illustrating the present invention, two embodiments in which the invention may take form, it being understood that the drawings are illustrative of the invention rather than limiting the same.

Since it is obvious that the invention may be embodied in other forms and constructions within the scope of the claims, I wish it to be understood that the particular forms shown are but two of these forms and various modifications and changes being possible, I do not otherwise limit myself in any way with respect thereto.

In the drawings:

Figure 1A is a chart;

Figs. 6, 7 and 8 are plan fragmentary sectional views of a portion of the control mechanism of Fig. 4 taken on the line 6—6 of Fig. 3 to illustrate the difference in operation when the time of energization of the light control relay is varied;

Figs. 9 and 10 are fragmentary side elevational views of structure shown in Fig. 3 and illustrate the latch mechanism for switches which control the slow acting relay and the power circuit to the operating motor;

Fig. 11 is a side elevational view of another embodiment of control mechanism for the door opening and closing motor, the mechanism being shown in full lines in the door closed position;

Figs. 12 to 15 inclusive are diagrammatic illustrations showing the operations of the solenoid controlled linkage and pawl mechanism and the motor control switch of Fig. 11;

Fig. 16 is a side elevational view of the structure of Fig. 11 taken on the line 16—16; and Fig. 17 is a wiring diagram.

Figure 1:
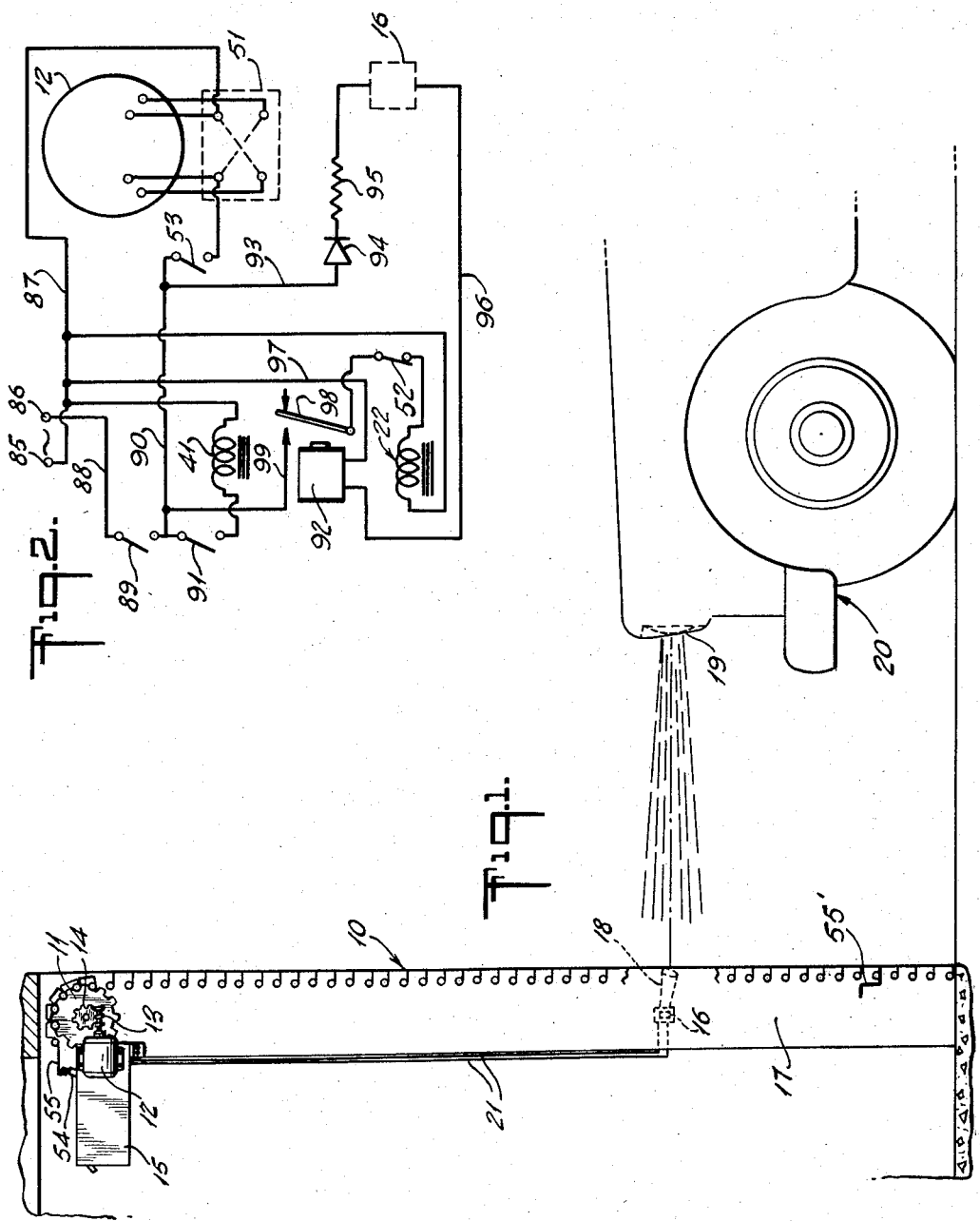
Fig. 1 is a side elevational view in partial section of an overhead door and a door opening device in accordance with the invention.

The method of operation and the timing of the operations, is indicated in the chart of Figure 1A. Here, opposite the legend "light," a light line indicates the time during which the light sensitive cell is lighted, the reversed arrows indicating the stoppage of the light; opposite the legend "main motor switch 53," a heavier dotted line indicates when that switch (53 of Fig. 2, etc.) is open, and a solid line indicates when that switch is closed; and opposite the legend "recycling switch 52," a still heavier solid line indicates when that switch is closed and a heavier dotted line indicates when it is open.

The portion A of the chart shows that when light is directed for not more than a fixed, short period of time (for pawl 69 and stop shoulder 82 to engage, as set forth hereinafter), the main motor switch (53) remains open and the recycling switch (52) remains closed. The portion B shows that when the light is directed for not more than a fixed longer period (for pawl 69 to pass by stud 78), the main motor switch is closed for a period sufficient for the door to open (or close), whereupon a reversing switch (51) is actuated and the main motor switch (53) opened; also the recycling switch (52) is thereafter opened and then closed, thereby restoring the circuit for a succeeding operation to close (or open) the door. The succeeding operation is also indicated. Portion C of the chart shows that prolonging the lighting of the crystal effects no change in the condition of the switches.

Referring now to the drawings and more specifically to the embodiment shown in Figs. 1 to 10 inclusive, the numeral 10 denotes a garage door movable vertically by a sprocket gear 11 driven by a reversible electric motor 12 through speed reducing means having a worm 13 and a cooperating worm wheel 14. The motor is operated by a control disposed within the cabinet or frame 15 which in turn is operated by a suitable light sensitive element 16 mounted in the frame 17 of the door 10. A tapered cone 18 is used to limit the angle of light acceptance, but will accept light from the head lamp 19 of a vehicle 20 approaching the garage. The light sensitive device 16 is coupled with the control 15 by suitable electric wires 21.

The detailed structure in the control box 15 and the operation thereof, is shown in Figs. 2 to 10 inclusive. Considering first the mechanical aspects of this control, 22 denotes a plunger type relay having a reciprocable plunger 23 movable to the left as viewed in Fig. 3 upon energization of the relay and movable to the right under the action of a retracting spring 24 connected to plunger members 25 by a cotter pin 26. The other end of the spring is connected by a cotter pin 27 to a frame member 49 to be described.

Figure 3:
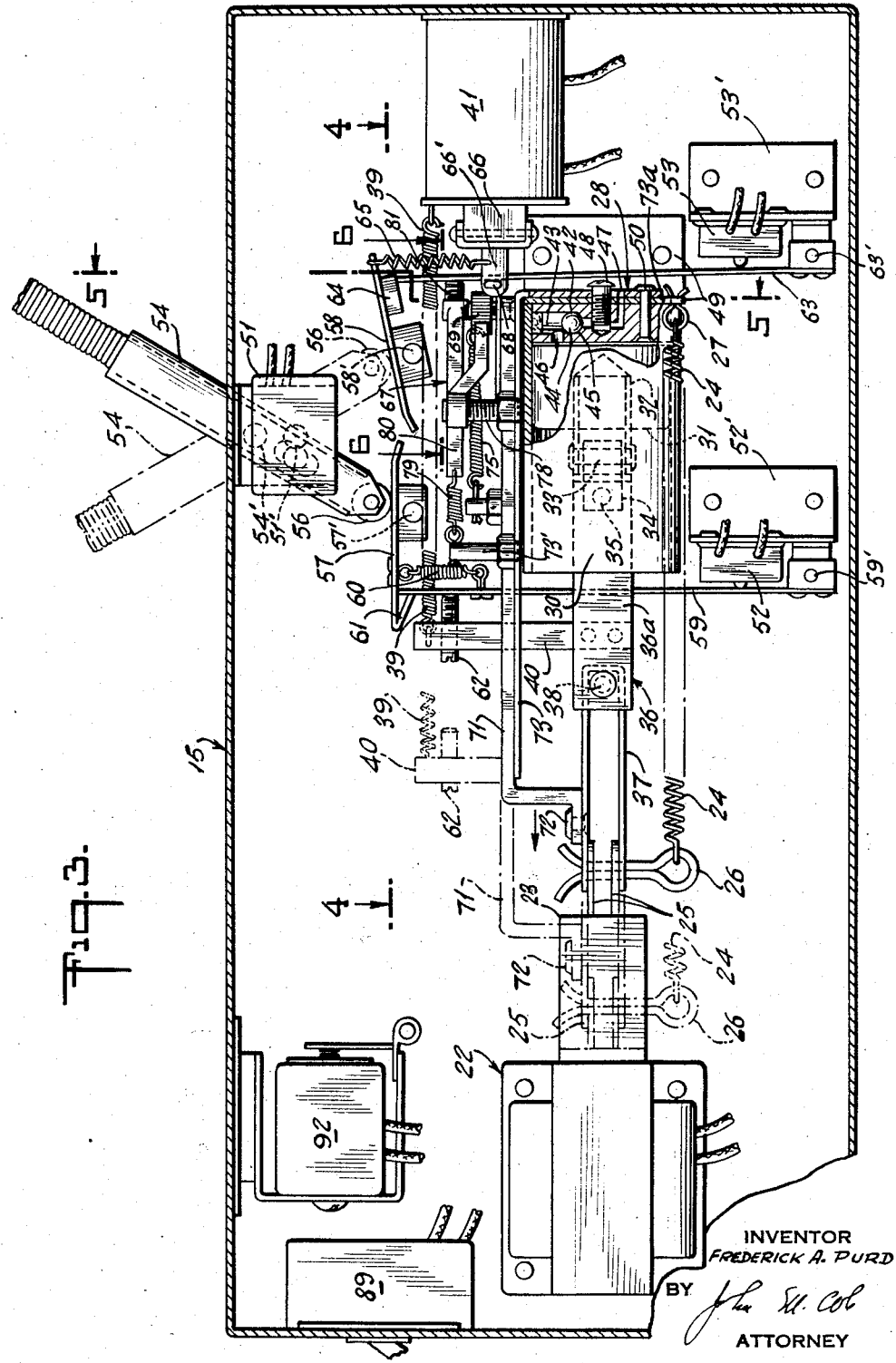
Fig. 3 is a side elevation in partial section of the control apparatus of Fig. 1 showing the parts in the door closed position in full lines and in door open position in dotted lines.

The frame member 49 also carries a cylinder 30 which receives a piston 31. The piston is provided with a short hollow shaft 32 connected by pin 33 with rod 34 which in turn is connected by pin 35 to plates 36a, 36a, forming a link 36. By disposing the connecting pins 33 and 35 at right angles one to the other a universal joint is provided to prevent any possibility of the piston 31 binding within the cylinder 30. The outer end of the link 36 is coupled to the plunger 23 by a clevis 37 pivotally connected to the plunger members 25 by the cotterpin 26 and slidably coupled to the link 36 by a pin 38. Retraction or movement of the piston to the right as shown in Fig. 3 after displacement by operation of the plunger magnet 22 is effected by a spring 39 coupled to a bracket member 40 carried by the link 36. The other end of spring 39 is connected to the housing of a second plunger magnet 41 as illustrated.

The rate of movement of the piston 31 within the cylinder 30 in each direction is controlled by a bleeder valve assembly in the base 42 of the cylinder. The cylinder is secured to the base member by a press fit, though any other suitable procedure may be employed. It has a transverse passage 43 having a ball valve 44 and cooperating seat 45 therein. One end of passage 43 communicates with the cylinder chamber by means of an opening 46 while the other end communicates with the atmosphere through the passage 47. A screw 48 functions as a needle valve to control the flow of air into the piston chamber while the ball check valve is arranged to limit the exhaust of air from the piston chamber. This mechanism effects a dash pot operation in each direction of piston movement. The bleeder valve base 42, and cylinder 30 are supported in alignment with the plunger magnet 22 by two or more rivets 50 shown passing through the bleeder valve assembly base 42, the downwardly extending flange 73a of the plate 73, and the frame member 49.

With the assembly thus far described, actuation of the magnet 22 will function to move the piston 31 to the left as viewed in Fig. 3 against the action of springs 24 and 39. This movement is controlled by the rate at which air is admitted to the cylinder chamber through the passages 47, 43 and 46. Upon deenergization of magnet 22 the lost motion connection 37—38 will permit the plunger to immediately move to the right under the action of spring 24. The return movement of piston 31 is independent as it will be effected by spring 39 and its rate will be controlled by the leakage of air past the ball check valve 44—45.

The operation of the drive motor 12 is effected through a reversing switch 51 and a pair of switches 52 and 53 which may be push button, micro-switches. The reversing switch 51 is of the toggle type and is actuated by an arm 54 pivoted at 54′ to the housing 15 and moved first in one direction and then the other by door carried bracket members 55 and 55′ shown in Fig. 1. The lower end of arm 54 as shown in Fig. 3 is provided with a roller 56 for the operation of switches 52 and 53 through rocker arms or cams 57 and 58 pivoted for rotary movement about the pins 57' and 58'.

The switch 52 is fastened to the housing 15 by a bracket 52', and is provided with an operating lever 59 that extends beyond cylinder 30 to meet cam 57. The cam and lever are held in contact by a spring 60 and a reversely bent portion 61 of cam 57 holds the lever in position with respect to the cam or rocker arm. This switch is of the normally open type and when the lever 59 pivoted at 59' is in position shown in Fig. 3, the switch is held closed. It will be observed in Fig. 9, for instance, that as the roller 56 on lever 54 is moved to the right, the right hand end of cam or rocker arm 57 is depressed so as to raise the other end, release the lever 59 and permit the switch 52 to open. The switch 52 is closed by the movement of the piston 31 to the right by reason of the vertically disposed bracket 40 and screw 62, the latter contacting the lever 59 (see Fig. 4) and moving it to the position shown in Fig. 3. Thus the switch 52 is always closed when the piston 31 is in the right hand position shown in Fig. 3.

The control switch 53 for the door operating motor 12 is mounted on the bracket 53' and is normally open. It is operated toward closed position by a lever 63. When the door is fully closed and the device is at rest, lever 63, pivoted at 63' is in the left hand position shown in Fig. 3 and the right hand end of the cooperating cam or rocker arm 58 is held up by a stop 64 which engages the lever 63. It is held in this position by a spring 65 connected between the cam 58 and the plunger 66, 66' of magnet 41.

Operation of the motor control switch 53 is effected both by the magnet 41 and by a latch and pawl assembly generally denoted by the numeral 67 and shown in detail in Figs. 4 and 6 through 8. The portion 66' of the plunger is bifurcated to embrace the lever 63 and carries a cross pin 68 at its outer end. Thus when magnet 41 is energized to attract the plunger 66 it and U-shaped member 66' will be moved to the right as shown in Fig. 3 to close switch 53.

Operation of the latch and pawl assembly 67 to close switch 53 is effected by the action of piston 31 and will now be discussed. A catch-member or pawl 69 for operation of the latch 70 is carried on the right hand end of a longitudinally extending retractor or link 71, connected at its left end to the clevis 37 by a pin 72 and slidably supported on the frame member 73. The other end of the link 71 is pivotally connected by pin 74 to a positioning member or swinging arm or lever 83 pivoted to the frame at 84 so that the link 71 oscillates about the pin axis 72 as it moves forward and back.

Figure 4:
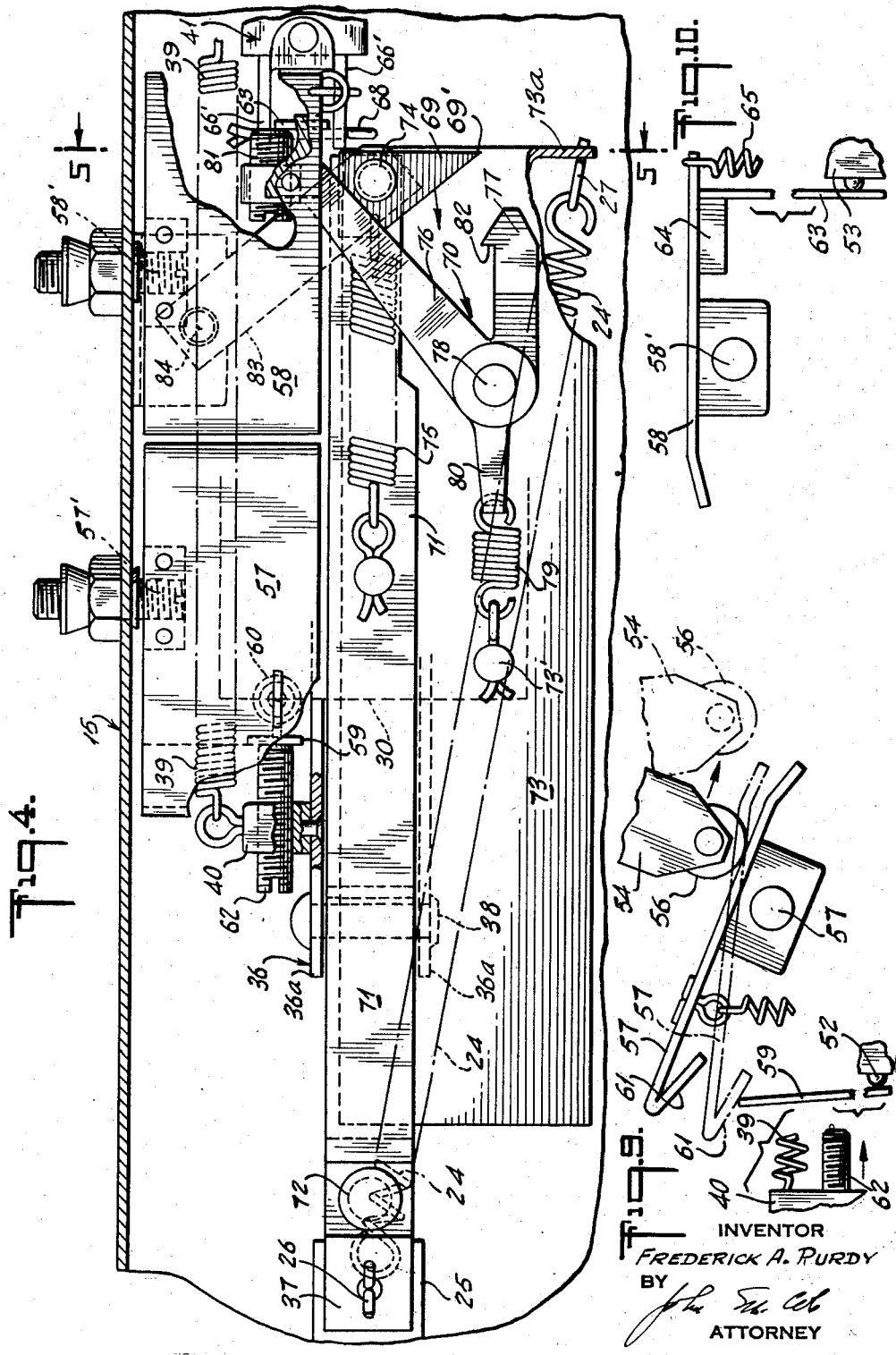
Fig. 4 is a cross sectional view taken along the line 4—4 of Fig. 3.
Figure 5:
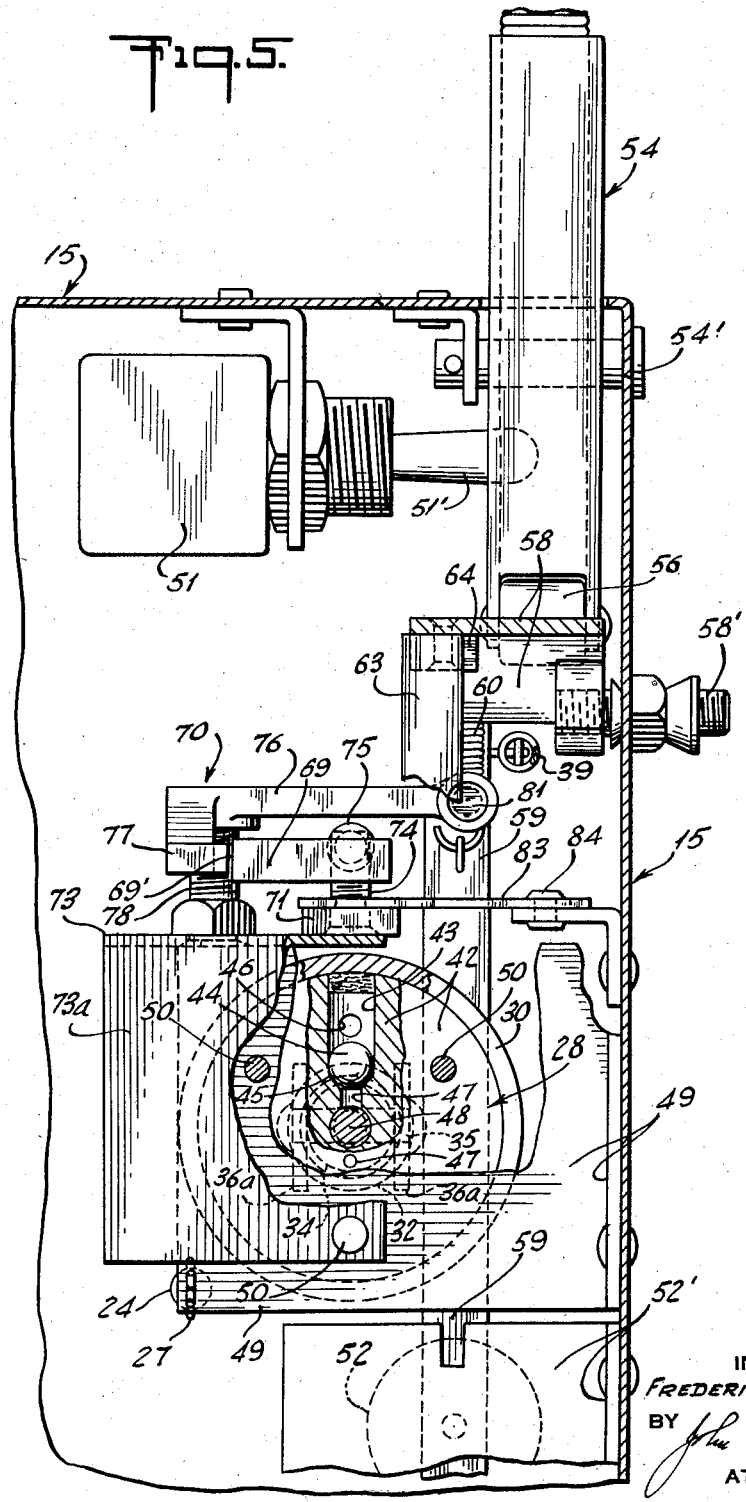
Fig. 5 is a cross sectional view taken on the line 5—5 of Figs. 3 and 4.

The pawl 69 is triangular in shape and pivoted to the link 71 by pin 74. It is held with its apex 69' extending forwardly (Fig. 4) of link 71 by a spring 75 disposed between the pawl 69 and link 71. The latch 70 is V-shaped with the legs 76 and 77 extending generally to the right of overturner or pivot 78 as viewed in Fig. 4. For convenience the pivot 78 is in the form of a machine screw secured to and extending upwardly from the frame member 73. The screw threadedly engages the latch 70 and in this way the elevation of the latch above the frame member 73 can be readily adjusted. The latch is held with the leg 77 substantially parallel with the link 71 by a spring 79 connected between a fixed stud 73' and a leg 80 extending to the left of pivot 78 as shown in Fig. 4.

Leg 76 of latch 70 extends outwardly to a point in alignment with the actuating lever 63 of switch 53 and carries an adjusting screw 81 while the leg 77 has a stop shoulder 82 for cooperation with the pawl 69. As will be shown, as the pawl 69 moves to the left for a short distance under the action of piston 31 and then the piston reverses its movement as indicated in Fig. 7, the pawl 69 will engage the shoulder 82 and rotate the latch 70 about the pivot to move the lever 63 to the right and close switch 53.

Certain steps in the operation of the latch and pawl assembly are shown in Figs. 6 to 8. In Fig. 6 the piston 31 has been actuated by the plunger of magnet 22 and has moved the link 71 to the left. This action rocked pawl 69 and brought the apex 69' past the shoulder 82 of leg 77. If the link 71 continues to move to the left as shown in dotted outline in Fig. 6, the pawl 69 will ride up onto the pivot member 78. Should the piston 31 be released to move to the right before the pawl 69 clears the pin 78, the pawl will come back to the full line position now shown in dotted lines in Fig. 7 where it engages shoulder 82. Further movement to the full line position of Fig. 7 will effect a toggle action and rock latch 70 about the pivot 78 to actuate switch lever 63 to the right as shown in Fig. 7. However, if the pawl 69 had moved far enough to the left to clear the pin 78, as shown in full lines in Fig. 8, the pawl will reverse its position on the return travel as shown in dotted outline and will not actuate the latch 70 and the switch lever 63 will not be affected.

The circuit diagram for the control described above is shown in Fig. 2. Energy is applied to the terminals 85 and 86 with the terminal 85 being connected through conductor 87 to the reversing switch 51. This switch is connected to the windings of motor 12 in the conventional manner so that as it is moved back and forth by the arm 54 it will cause the motor to rotate first in one direction and then the other when energy is applied. The other terminal 86 is connected through conductor 88, master control switch 89, conductor 90 and switch 53 to the reversing switch 51. Thus when switches 89 and 53 are closed motor 12 will be energized.

To secure manual operation of the motor switch 53, the plunger magnet 41 is connected in series with a manually operated switch 91 between the conductors 87 and 90.

The light sensitive device 16 functions to operate a D. C. relay 92 through the circuit including conductor 90, conductor 93, rectifier 94, current limiting resistor 95, light sensitive device 16, conductor 96, relay 92 and conductor 97 to conductor 87. Thus when the device 16 is illuminated current will flow through the above circuit and actuate relay 92. This action closes contacts 98 and 99 of relay 92 and completes the circuit from conductor 90 through relay contacts 98, 99, switch 52 and relay 22 to conductor 87. This energizes the relay 22 and the parts connected to its armature 23 move to the left at a speed determined by the dash pot action of the piston-cylinder-mechanism.

In the operation of the device described above, let it be assumed that the garage door 10 is closed and the piston 31 is to the right as shown in Fig. 3. When the car 20 approaches to enter the garage, the operator directs the headlight 19 on the light sensitive device 16. This action, with switch 89 closed, will actuate D. C. relay 92 to close the circuit to relay 22 and initiate leftward movement of the piston 31 outwardly of cylinder 30. It takes a predetermined time for the pawl 69 to proceed far enough to engage ratchet 70 as shown in Fig. 6 but not far enough to be tripped or overturned as shown in Fig. 8, whereupon the operator should turn off the head light. This will deenergize relay 22 and the piston will be retracted by retracting spring 24 and in doing so it will as shown in Fig. 7 move the latch 70 and lever 63 to close switch 53 and operate the motor at the same time cam or rocker arm 58 rotates about its pivot under the action of spring 65 and holds the switch 53 closed, see Fig. 10.

Just before the door 10 reaches its fully open position, bracket 55' carried on the lower part of the door has reached the reversing switch arm 54 to cause it to assume the dotted line position of Fig. 3. In so doing both cams or rocker arms 57 and 58 are tripped causing switches 52 and 53 to open and stop motor 12. When piston 31 reaches the end of its travel to the right it will close switch 52 through bracket 40 and screw 62.

After the door has opened, time should be allowed to drive the car into the garage without the possibility of the door coming downward upon the car. Such a possibility might occur should a driver at a two-car garage, waiting till door was open with headlights still directed towards crystal 16, turn on the lights as he swerved the car away from the door-frame to enter the garage. Or it might occur due to the arrival of another car and the swing of that car's headlights past the crystal 16. After the door has closed, time should be allowed the driver to maneuver the car in the driveway without causing a reopening of the door, as might occur if rays from the headlights swung past the crystal.

The re-closing of switch 52 occurs with movement of piston rightward of Figures 3 and 4, this movement of piston affording the required time-period. It will be noted that clevis 37 draws links 36a and piston 31 leftward with plunger 23 when solenoid 22 is energized, but that when solenoid 22 is de-energized and the retractive movement occurs rightward clevis 37 slides free on pin 38 and effects no movement of piston 31. Thus the retractive movement is made with no retarding influence of the air-timer. Movement of piston 31 rightward of Figures 3 and 4 is effected by spring 39 (independently of plunger 23 and clevis 37) against a greater air-resistance than occurs in the leftward movement, for in the rightward movement ball 45 checks the flow of air, and the time-period for the completion of the rightward movement is determined by the leagage of air past the piston and the ball-check. This time-period, fifteen seconds or otherwise, is established by experiment in the reaming of cylinder 30. At the end of the rightward movement, screw 62 on rod 40 moves lever 59 to the right to press button of switch 52 to close the switch, and to become engaged and held by latch 57.

After the car is in the garage, the operator manually closes switch 91 actuating magnet 41 to close switch 53. The motor is again operated but in the reverse direction to close the door. When the door is about to reach its fully closed position the upper door bracket 55 shifts the lever 54 back to the full line position of Figure 3, tripping both cams 57 and 58. This causes switch 53 to open but inasmuch as switch 52 is held in the closed position by piston 31, the cam 57 will immediately return to the position shown in Figure 3.

Door operation to open or close may be had by the alternatives of closing switch 91 manually, or of applying light from the car's headlamp to the crystal 16. These alternatives may be selective, without adhering to any prescribed sequence. In general, headlamp operation will be the practice when the user is seated in the car outside the garage to open upon arrival or to close upon departure; and manual operation will be the practice when the user is on his feet, having put the car into the garage, or having gone to take the car out.

A significant advantage of this device is that it requires sustained illumination of the light sensitive means 16 for a predetermined period of time and the turning off or removal of the light. The device is responsive to illumination between predetermined maximum and predetermined minimum periods. Thus rapid flashes of light will not function to bring the pawl 69 into engagement with the ratchet 70 while continuous illumination for extended periods will merely move the pawl 69 beyond the pin 78, in which case return movement of the pawl will not actuate the latch. Thus sunlight, if reaching the light sensitive device or reflected onto it will merely inactivate the device and upon interruption the piston will merely move to its position of rest. Should it be desired to operate the door 10 during the period it is inactivated by sunlight, it is merely necessary to bring the vehicle into position to block the sunlight, wait until the piston returns to the right hand position of rest and then actuate the light sensitive means in the manner described above.

Figures 11 to 17 inclusive show an alternate embodiment of the invention which retains the immobilizing feature when activated by a sustained signal such as sunlight. The control mechanism is housed within a frame or cabinet 101 and functions to operate a door such as the garage door 10 of Figure 1 through the medium of motor 12 and associated reversing switch 51 as described.

The control apparatus is operated by means of a vertically acting plunger magnet 102 supported by the frame 101 and having a reciprocable plunger 103. This magnet 102 (see Fig. 17) is operated in response to the closure of a light controlled sensitive relay 104 connected in a circuit with power supply terminals 105, 106, rectifier 107, resistor 108 and light sensitive means 109. The light sensitive means 109 may be identical with the light sensitive device 16 as shown and described in connection with Figs. 1 and 2 though in this embodiment of the invention it is treated as a self-generating cell energized by light. Energization of relay 104 in response to the illumination of the light sensitive device 109 closes contacts 110 and 111 and applies energy from terminals 105 and 106 directly to the winding of the magnet 102. A master control switch 112 is connected in series with terminal 106 to turn the apparatus on and off, and a manually operated push button switch 109' may be used to shunt the light sensitive device 109, as shown, or may be connected between relay contacts 110 and 111 if desired.

The plunger 103 of magnet 102 is normally in the lower or full line position of Figures 11 and 16. It is connected at 112 with a positioning member or link 113 pivoted at 114 so as to swing this link upwardly from the full line position. Link 113 is connected by a short cross shaft 115 with connecting straps or links 116, 116 which are connected by pin 117 and tube 117' with a piston 118. This piston is received in a cylinder 119 closed at upper end 119' and having a vent opening 120. This piston 118 carries a ball check valve 121 adapted to control the flow of air through the tube 117 and vent passage 122 therein. When the magnet 102 is energized the piston 118 is quickly moved up past the opening 120 and then its rate of movement depends upon how fast the air can leak out by the check valve. Upon de-energization of the magnet 102, the piston and connecting mechanism quickly drop, for the check valve offers no substantial resistance to the entrance of air behind the piston.

When the magnet is energized, the pivot point 115 travels up through the arc 115a and when the magnet is deenergized this pivot point traverses the same arcuate path. The pivot 115 connecting links 113 and 116 also carries a catch-member or pawl 123 biased to a neutral position by a spring 124. This pawl is free to turn in either direction so that the point 123' of the pawl may traverse arcs such as is indicated in 123a. It will be noted that in the normal position of rest of the pawl 123, the point 123' is nearer the axis 114 than it is when swung to bring it into line with the centers 115 and 114. Thus the point 123' of the pawl is adapted to be shifted outwardly the amount indicated at 126, Figures 11 and 13. This operation is utilized in closing the motor control switch.

Figure 2:
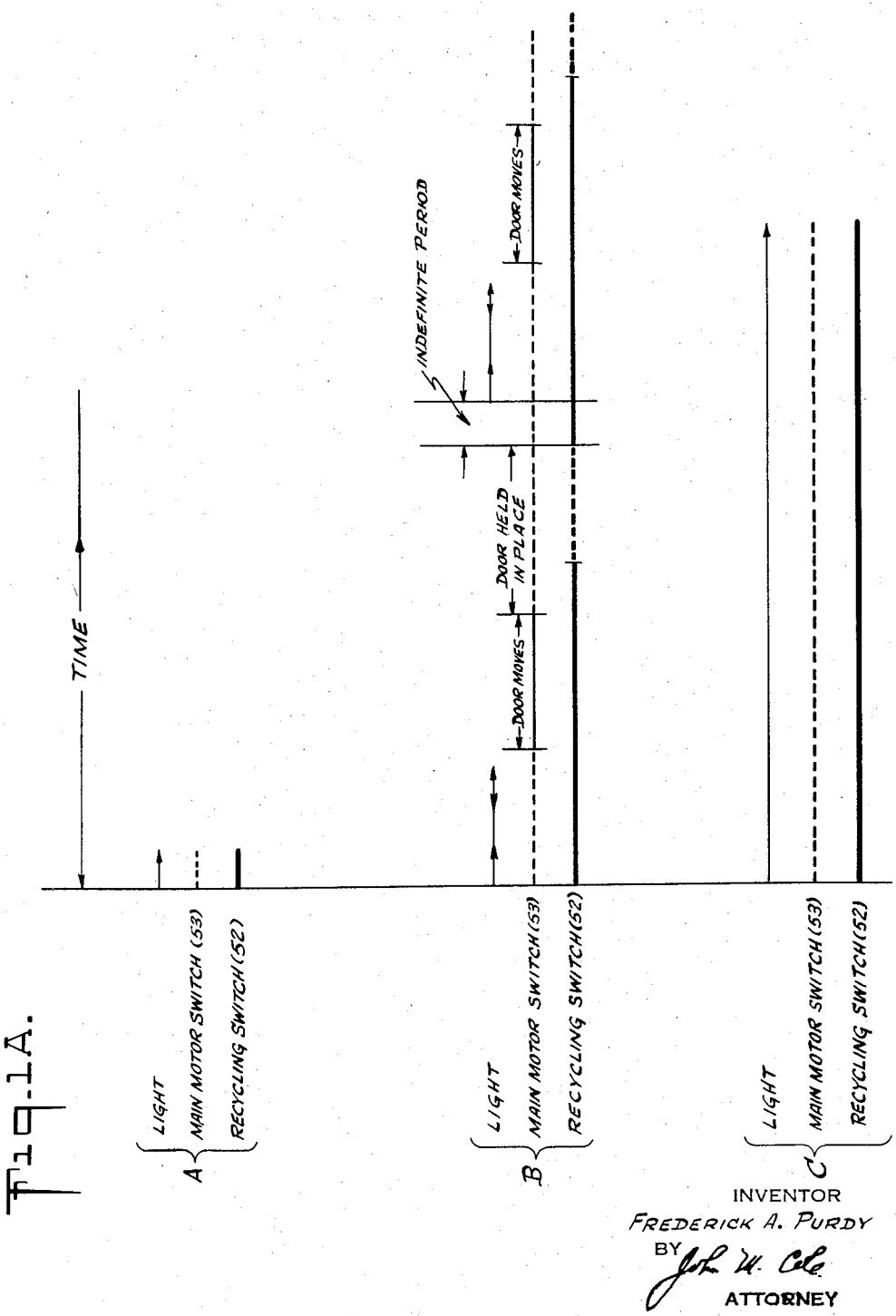
Fig. 2 is a schematic wiring diagram of the embodiment of the invention shown in Fig. 1.

The normally open, motor operating switch 132, corresponding with switch 53, Figure 2, is mounted on an inclined portion 133 of the bracket member 134. The lower portion of this bracket member 134 is bent to form upper and lower legs 135 and 136 and a vertically disposed leg or overturner 137. The bracket member is secured to the frame 101 by rivets 138, or other suitable fastening means. The switch may be a micro-switch or other similar device and is actuated by a push button 132'.

The switch 132 is thrown by a lever 139 secured to the bracket part 133 by an adjustable screw mounting 140 and extending downwardly below the lower leg 136 of bracket 134. The lower end of the lever 139 is provided with a Z-shaped bracket 141 having outwardly turned leg parts 142 and 143. The outwardly turned portion or lip 143 of bracket 141 is arranged to cooperate with a latch 144 pivoted to a stationary bracket member 145 at 146. This latch is normally in a downward position as illustrated in Figure 11 and is operated by a vertically disposed link 147 which in turn is operated by the motion of the door being controlled in the manner to be described.

Figure 12 illustrates the action which takes place upon energization of the magnet 102. It will be first described as though this magnet were energized for a long enough period of time to complete the stroke and shift the piston all the way to the top of the cylinder. Pivot 115 moves along the arc 115a through a series of points which have been marked A, B, C, D, E, F. The corresponding positions of the point 123' of the pawl 123 are indicated by the points a, b, c, c', d, e, and f. It will be noted that as the piston is raised the point of the pawl 123 rides up over the lip 142, then swings counter clockwise until it meets the bracket leg 137. It then rides up along this leg until at point E it swings free and is carried then to the free position Ff.

Such complete movement of the plunger and piston is not what is normally desirable, for the operator wishes to open the door in response to a short period of energization of the self generating cell. This occurs when the mechanism is moved to approximately the position indicated in Figure 12 at Dd and at this time the piston is about to cover the vent 120. Should the head light be turned off when the parts are in positions indicated at Dd or Ee of Figure 12, an action takes place which is indicated in Figure 13. The deenergization of the cell has deenergized coil 102 and the mechanism is therefore ready to drop under the influence of gravity. The pawl quickly moves from a position corresponding to Dd of Figure 12 to a position indicated at Gg of Figure 13. As the mechanism continues its downward movement the point 123' of the pawl is snubbed by lip 142 of the switch closing mechanism and this causes the linkage formed by the link 113 and the pawl 123 to straighten out as shown in full lines in Figure 13. This brings the pivot for the pawl to the point indicated at H, Figures 13 and 15, and has caused the point of the pawl to move away from the center 114 in an amount indicated by the spacing 126 of Figures 11 and 13. This action has caused the lip 143 of the bracket 141 to enter the notch 144' of the latch 144 and has closed the motor control switch 132 and held it closed. As the parts continue to move, the pawl 123 swings to the full line J position of Figure 15. It then moves back to the original position A.

Should the magnet 102 have been energized so long a time as to raise the piston to its uppermost position and bring the parts to the position indicated at Ff, Figures 12 and 14, the switch 132 will not be actuated in response to deenergization of the light cell. On the return of the pawl 123, from its uppermost position Figure 14, it traverses a different path than on the way up. This path is indicated by the letters, Kk, Ll, Mm, Mm', Nn, Aa. It will be seen that the nose or point of the pawl merely drags along the obstructions without affecting the switch 132.

Release of the switch lever 139 to open the switch 132 after the travel of the door 10 from the open to the closed position and vice versa is effected by the lever 150 movable about a pivot 151. This lever is actuated by a rod 152 which is moved to the upper position shown in Figure 11 when the door 10 is closed and is moved downwardly when the door is opened. This rod 152 is shifted back and forth in a manner similar to the control lever 54 of the embodiment shown in Figure 1 and may be actuated by the brackets 55 and 55' as previously described.

The lever 150 operates a rocker arm 153 which is fixedly secured to its inner end and has a pointed end portion 154 that rides on the under side of a transverse lever 155 pivoted to the frame 101 at 156. The outer end of the lever 155 is coupled with the link 147. When the rocker arm 153 is moved from its left hand position shown in Figure 11 to a right hand position it functions to move the lever 155 upwardly and thereby lift the latch 144 to release the switch operating lever 139. When the rocker arm resumes its right hand position the lever will drop to the horizontal position illustrated in the drawings. Similar action occurs when the rocker is moved from its right hand position to its left hand position on closure of the door 10. In addition to operating the latch 144 the rocker also engages the arm 51' of reversing switch 51 to reverse the motor in substantially the same manner as shown in connection with the embodiment of the invention shown in Figures 1 to 10 inclusive.

Assuming now that the door is closed and the elements of the control are in positions indicated in Figure 11, the operator would illuminate the self-generating cell 109. This would immediately actuate the magnet 102 and cause the piston 118 to move upwardly so that the pawl 123 engaged the lower end of the switch lever 139. If the illumination of the self-generating cell 109 is then removed at any time prior to the time pawl 123 leaves the upper end of the leg 137 of bracket 134, the relay 102 will be deenergized and the piston will move downwardly causing the pawl 123 to engage the lever 139 and move the lip 143 of bracket 141 into engagement with the latch 144. This action closes the switch 132 and operates the motor 12 to open the door. As the door reaches its uppermost position it moves the operating rod 152 downwardly to operate the reversing switch 51 and momentarily raise the latch 144 to open the switch 132 and turn off the motor.

To close the door the switch 109' which by-passes self-generating cell 109 is closed for a short period of time to actuate the magnet 102 and again cause the pawl 123 to depress and latch the lever 139. As the door reaches its closed position it will lift the latch 144 to open the motor circuit and operate the reversing switch. It is important in the operation of this device that the latch 144 be lifted to open the motor circuit just prior to or simultaneously with the operation of the reversing switch 51.

It will be observed in the foregoing discussion that, in the event sunlight or any other sustained signal should actuate this control system, the piston will move upwardly to the point where the pawl 123 will clear the vertical leg 137 of bracket 134 in which case upon deenergization of the magnet 102 the pawl 123 will return to its lowermost position without actuating the door being controlled. It will be observed, however, that in this embodiment of the invention the return of the piston to its lowermost position is substantially instantaneous and does not embody the time delay employed in the first described embodiment of the invention. In this way should the operator of a vehicle inadvertently apply illumination to the light sensitive device 109 for too long a period of time, he need only turn off his lights for a few seconds and then try again in order to actuate the door. While this device operates substantially instantaneously in response to the application of illumination to the self-generating cell 109, on the other hand the inertia of the elements cooperating to attain the result provide a time delay sufficient to prevent actuation of the device by extremely short flashes of light such as transient flashes of head lights or lightning.

It has been found that excellent results can be obtained with both forms of the invention by the adjustment of the elements so that application of the light for two or three seconds will operate the door whereas illumination of the control beyond that period will automatically inactivate it.

While only two embodiments of the invention have been illustrated and described, it is apparent that changes, al-

What is claimed is:

1. Apparatus for controlling a motor operated door comprising at least one normally open motor control switch, a pivotally mounted ratchet member for closing said switch, means responsive to the closure of said switch for holding it in the closed position, a reciprocably mounted pawl cooperating with said ratchet and movable in one direction for engagement with said ratchet and in the other direction for actuation of said ratchet to close said switch, means for tripping said pawl upon movement past a predetermined point in said one direction to prevent actuation of said ratchet upon movement in the other direction, means responsive to movement of the door being controlled to release said switch holding means and stop said motor and means responsive to a control signal for producing reciprocation of said pawl to operate said motor.

2. Apparatus according to claim 1 wherein the last said means includes a plunger magnet and a piston and cylinder assembly connected therewith for moving said pawl at a predetermined speed during at least part of its movement in said one direction.

3. Apparatus according to claim 1 wherein the last said means includes light sensitive means, at least one electromagnetic device responsive to said light sensitive means for moving said pawl in at least one direction, and a piston and cylinder assembly coupled with said device for controlling the rate of motion thereof.

4. Apparatus for controlling a motor operated door comprising a reversing switch connected with said motor, a normally open motor control switch, a pivotally mounted ratchet member movable about its pivot to close said control switch, means for releasably holding said switch in the closed position upon actuation by said ratchet, a plunger magnet responsive to an electrical signal to retract its plunger, an elongated bracket member pivotally coupled with said plunger at one end, a pawl pivotally mounted on the other end of said bracket member for cooperation with said ratchet, spring means for positioning said pawl relative to said ratchet, said bracket member being movable in one direction upon actuation of said magnet to bring said pawl into engagement with said ratchet, spring means for moving said pawl in the other direction upon deenergization of said plunger magnet and operating said ratchet to close said control switch, means for tripping said pawl upon movement beyond a predetermined point in one direction whereupon said pawl is immobilized upon its return movement in the other direction, a piston and cylinder assembly coupled with said plunger magnet for controlling the rate of motion of said plunger and pawl, a normally closed plunger magnet control switch, means responsive to the movement of the door being controlled to open both control switches after closure of the motor control switch to operate said door and to actuate said reversing switch and means responsive to the movement of said piston to its position of rest for closing said magnet control switch.

5. Apparatus according to claim 4 wherein said plunger magnet is actuated by a light sensitive control device.

6. Apparatus according to claim 5 wherein electromagnetic means are provided for closing said motor control switch for manual operation of said apparatus.

7. Apparatus according to claim 4 wherein the other end of said elongated bracket member is pivoted to a lever for movement of said pawl through an arcuate path toward said ratchet in the reciprocation thereof.

8. Apparatus according to claim 4 wherein said ratchet is provided with at least two outwardly extending arms, one of said arms including a notch for engagement of said pawl and the other of said arms having adjustable means for closure of said motor control switch.

9. Apparatus for controlling a motor operated door comprising a normally open motor control switch, a lever for operating said switch, a releasable latch associated with said lever to engage said lever upon its movement to close said switch, a piston and cylinder assembly, a piston rod coupled to said piston, a pawl pivotally secured to said rod, means reciprocating said piston to move said pawl in one direction to engage said lever and in the other direction to move said lever into engagement with said latch and hold the switch in the "on" position to operate said door, and means responsive to the movement of the door for releasing said lever to stop further movement of the door.

10. Apparatus according to claim 9 wherein means are provided for tripping said pawl upon movement in said one direction beyond a predetermined point whereby movement of the pawl in the other direction will not actuate said motor control switch.

11. Apparatus according to claim 9 wherein said piston is actuated by electromagnetic means coupled therewith and said piston is movable rapidly in said one direction to engage said switch lever and then continues in the same direction at a predetermined slower speed and is movable rapidly in said other direction.

12. Apparatus according to claim 9 wherein said motor includes a reversing switch connected therewith and means are provided for tripping said latch to open the control switch and actuating said reversing switch in response to movement of said door.

13. In control apparatus, pawl and ratchet members movable one relative to the other, means for moving one of said members in one direction for engagement with the other member and in the reverse direction for actuation of the other member and means responsive to a predetermined degree of relative movement of said members in said one direction to prevent engagement and actuation of said other member upon movement in said other direction.

14. In control apparatus according to claim 13, wherein said apparatus further includes speed control means coupled with said members.

15. In combination, an electric motor, a reversing switch for controlling the direction of rotation of the motor, apparatus drivingly connected to the motor to be operated between two positions and having connections with the reversing switch to actuate it at the end of each movement of the apparatus, a main switch in the motor circuit biased to open position, a controller for the main switch responsive to energization between predetermined minimum and maximum finite periods of time to close the main switch and non-responsive to energization for lesser or greater periods of time, and including a magnet coil, a plunger, means biasing the plunger to one position, a dash pot imposing a drag on the plunger to time its movements, so that its displacement by the magnet coil depends upon the period of energization, a member traveling with the plunger, a second member moveable to close the switch, said two members being disconnected from one another except when the plunger is being returned by the biasing means from one finite displacement to another lesser finite displacement and then engaging to actuate the switch to closed position, and a latch to hold it closed until released by the reversing switch actuator.

16. The combination of claim 15, including a pivotally mounted pawl bodily movable back and forth by the plunger, means biasing the pawl to a neutral position from which it is shifted when the pawl meets an obstruction, and obstructions with path of the pawl past which it freely passes when moved by the plunger in either direction, said obstructions being so located that when returning within the said maximum finite period of time the pawl forms together with the member traveling with the plunger a toggle which is straightened out to actuate the switch.

17. In combination, a door movable between open and closed positions, an electric motor for operating the door, a reversing switch for controlling the direction of rotation of the motor, door operated means for actuating the reversing switch at the end of each door movement, a light sensitive crystal, a relay in circuit with the crystal, a main switch in the motor circuit biased to open position, a controller for the main switch responsive to energization of the relay between predetermined minimum and maximum periods of time to close the main switch and non-responsive to energization of the relay for lesser or greater periods of time, and including a magnet coil, a plunger, means biasing the plunger to one position, a dash pot imposing a drag on the plunger to time its movement, so that its displacement by the magnet coil depends upon the period of energization, a member traveling with the plunger, a second member movable to close the main switch, said two members being disconnected from one another except when the plunger is being returned by the biasing means from one finite displacement to another lesser finite displacement and then engaging to actuate the main switch to closed position, and a latch to hold the main switch closed until released by the reversing switch actuator.

18. Means for controlling the repetitive operations of an electric motor driven apparatus having a finite movement accomplished in a predetermined time each time the motor is energized, comprising a relay having a closed relay coil circuit including a light sensitive crystal which, during the time it is subject to light of predetermined intensity, passes current to energize the relay and close the normally open contacts thereof, a circuit in series with the relay contacts and including a normally closed recycling switch and a solenoid having an armature connected to a slow-acting, spring-returned dash pot which retards the movement of the armature in both directions, a normally open, main motor control switch, means for opening the main motor control switch at the end of the motor operation, means responsive to the return movement of the armature after the stoppage of light at the crystal for a period in excess of a predetermined minimum period and not in excess of a predetermined maximum period less than that to effect complete movement of the armature, for closing the main motor switch, and means responsive to the completion of the return movement of the armature and acting, after the motor has completed the movement of the apparatus it drives and has opened the main motor switch, to open the recycling switch and then reclose it, to thereby secure a timed spacing of the repetitive operations of the motor driven apparatus irrespective of the lighting of the crystal during the time the main switch is closed.

19. In a door-operator, a motor for driving the door, a circuit for the motor and a switch in the circuit, an electro-magnet, a plunger arranged to stroke inward of the magnet's winding when magnet is energized and to stroke outward of magnet's winding when magnet is de-energized, a catch-member for closing said switch, connections to the plunger for actuating said catch-member, means for energizing and de-energizing the magnet, and means for applying said catch-member to close said switch in the stroke of said plunger made when magnet is de-energized.

20. The combination of claim 19 in which the means for energizing and de-energizing the magnet includes a crystal responsive to light.

21. The combination of claim 19 with a timer for controlling the rate of movement of the plunger, and parts co-operating with the catch-member to position the catch-member for ineffectiveness upon said switch when the travel of plunger in its stroke inward of said magnet carries beyond a predetermined period of time.

22. The combination of claim 19 and parts co-operating with said catch-member for positioning the catch-member into ineffectiveness upon said switch when the travel of plunger inward of magnet winding exceeds a predetermined distance.

23. In control apparatus, an actuable element, an advancing and returning member for actuation of said element, signal means for actuating the advancing and returning member to advance upon application of the signal and to return upon the interruption of the signal, and parts co-operating with the advancing and returning member to actuate said element in the returning movement of the said member, timing means for limiting the advancing period of the advancing and returning member, and, upon said member exceeding the limit, for disabling said element as to effectiveness in its returning movement.

24. In a door-operator, a door-drive motor, a circuit for supplying power to the motor, and a power-switch in the circuit, a light-sensitive system for closing the power-switch to operate the door, a circuit in this system and an immobilizing switch in the circuit, means to open said immobilizing switch after each door-operation, limiting means for limiting within minimum and maximum finite periods of time the power-switch closing effectiveness of said light-sensitive system, and for limiting to a predetermined period of time after each door-operation the open condition of said immobilizing switch.

25. In a door-operator, a door-drive motor, a circuit for supplying power to the motor and a power-switch in the circuit, a solenoid, a circuit therefor, and a solenoid-switch in the circuit, a relay for closing the solenoid-circuit, a light-sensitive crystal in a circuit to the relay-coil, and a timing system including said solenoid, an engaging member moved by said solenoid for closing said power-switch, a dash-pot for timing the movement, and limit-members to limit the power-switch closing effectiveness of the engaging member within minimum and maximum finite time-periods of light-application at the said light-sensitive crystal.

26. Equipment operating in advancing and returning movements, a reversible motor for moving the equipment to advance and return, a circuit for the motor and a power-switch therein, a reversing switch for reversing the direction of rotation of said motor, means for automatically throwing the switch for reversing the polarity of the motor at the termination of each advancing and returning movement, a light-sensitive crystal exposed to reception of applied light, electrical connections from the crystal for energizing a solenoid, a solenoid and a reciprocating armature therein, a spring-loaded dash-pot for retarding through a period of time the movement of the armature, means associated with the armature for closing said power-switch, and for limiting said power-switch closing to occur within minimum and maximum finite limits of time.

27. The combination of claim 26 with means for holding said power-switch closed until completion of movement of said equipment and for opening said power-switch simultaneously with each said operation of said reversing switch.

28. The combination of claim 26 with a re-cycling switch, means for actuating the re-cycling switch for opening the said electrical connections from crystal to solenoid after each advancing and returning movement of said equipment, and for closing said electrical connections within a predetermined period of time after opening.

29. In a light-sensitive control, a crystal electrically responsive to applied light, electrical connections from said crystal to a solenoid, a solenoid for energization while light is applied to the crystal, a work-load motor, a circuit therefor, and a switch in the circuit, a catch-member associated with the solenoid to throw said switch, a timer for controlling the time period of movement by the catch-member, and an element for directional positioning of said catch-member for throwing said switch when said solenoid is de-energized after a predetermined time-period of movement.

30. The combination of claim 29 with a cancelling element for cancelling the switch-throwing effectiveness of said catch-member after a predetermined time-period of movement.

31. In a door-operator, a motor for driving the door and a power-circuit therefor, a light sensitive cell electrically responsive to light as from the headlamp of an automobile, a relay having its energizing coil in series with said cell, a mechanism for measuring time by movement, a solenoid in the secondary circuit of said relay for applying said movement to said mechanism when energized by application of light at said cell, said mechanism including a catch member for closing said power circuit, a positioning member for circuit-closing poising of said catch member, and a retractor for circuit-closing throw of said catch member.

32. The combination of claim 31 with means for power-circuit-closing actuation of said retractor upon the extinguishment of light at said cell.

33. The combination of claim 32 with an overturner for unpoising said catch member after application of light beyond a prescribed period of time.

34. In a door-operator, a motor for driving the door, a circuit for supplying electric power to the motor, motor-circuit control means including a light-sensitive device to and from which substantially no electric current will flow when dark and to and from which electric current will flow when lighted as by the headlamp of an automobile, and means for actuating said motor-circuit control means, including a motor-circuit closer arranged for movement into potential circuit-closing position by a single application of light to the light-sensitive device, and arranged for circuit-closing actuation upon withdrawal of such light from said light-sensitive device during a predetermined time interval.

References Cited in the file of this patent

UNITED STATES PATENTS

| | | |
|---|---|---|
| 2,149,177 | Miller | Feb. 28, 1939 |
| 2,450,021 | Schirmer et al. | Sept. 28, 1948 |
| 2,572,785 | Vaughn | Oct. 23, 1951 |
| 2,641,713 | Shive | June 9, 1953 |
| 2,672,582 | Hahn | Mar. 16, 1954 |
| 2,676,294 | Wilcox | Apr. 20, 1954 |
| 2,697,803 | Eadie | Dec. 21, 1954 |
| 2,742,280 | Wilcox | Apr. 17, 1956 |
| 2,750,453 | Pritchard | June 12, 1956 |
| 2,760,134 | Johnson | Aug. 21, 1956 |